(12) United States Patent
Sartori

(10) Patent No.: US 12,403,642 B2
(45) Date of Patent: Sep. 2, 2025

(54) FILTERING DEVICE FOR MOLTEN POLYMERIC MATERIALS WITH COUNTERFLOW CLEANING SYSTEM

(71) Applicants: Alessandro Sartori, Vicenza (IT); Break Machinery Srl, Grantorto (IT)

(72) Inventor: Alessandro Sartori, Arcugnano (IT)

( * ) Notice: Subject to any disclaimer, the term of this patent is extended or adjusted under 35 U.S.C. 154(b) by 74 days.

(21) Appl. No.: 18/692,811

(22) PCT Filed: Jul. 8, 2022

(86) PCT No.: PCT/IB2022/056319
§ 371 (c)(1),
(2) Date: Mar. 16, 2024

(87) PCT Pub. No.: WO2023/041996
PCT Pub. Date: Mar. 23, 2023

(65) Prior Publication Data
US 2024/0375338 A1    Nov. 14, 2024

(30) Foreign Application Priority Data
Sep. 17, 2021    (IT) .......................... 102021000023948

(51) Int. Cl.
B29C 48/27      (2019.01)
B29C 48/694     (2019.01)

(52) U.S. Cl.
CPC .......... *B29C 48/273* (2019.02); *B29C 48/694* (2019.02)

(58) Field of Classification Search
CPC . B29C 48/273; B29C 48/2735; B29C 48/694; Y02W 30/62; B29B 7/58
See application file for complete search history.

(56) References Cited

FOREIGN PATENT DOCUMENTS

| AT | 399844 | 7/1995 | |
|---|---|---|---|
| AT | 413497 | 3/2006 | |
| CN | 105058735 | 11/2015 | |
| DE | 3239030 | 9/1983 | |
| DE | 202017007054 | 5/2019 | |
| DE | 202017007054 U1 * | 5/2019 | ......... B29C 48/6914 |

* cited by examiner

*Primary Examiner* — JaMel M Nelson
(74) *Attorney, Agent, or Firm* — Themis Law

(57) ABSTRACT

A filtering device for plastic materials in a molten state includes two filters made of a metal mesh and arranged side by side inside a filtration chamber, and a cleaning device between the two filters, the cleaning device in turn including one or more pairs of main hollow bodies provided with adhering walls that adhere to the filters or holed supports of the filters.

7 Claims, 8 Drawing Sheets

FILTERING DEVICE FOR MOLTEN POLYMERIC MATERIALS WITH COUNTERFLOW CLEANING SYSTEM

This patent relates to molten plastic filtration systems, in particular to molten plastic filtration systems during the recycling processes of the plastics themselves.

More specifically, this patent relates to the cleaning system of molten plastic filtration devices, in particular to molten plastic filtration systems during the recycling processes of the plastics themselves.

The problem of the recovery/recycling of plastic material for reuse in the production of new products is well known.

The plastic material to be recycled is subjected to a melting process and a simultaneous filtering process to free it of impurities. The molten and filtered material is thus suitably treated to obtain a granular product for example, in order to be reintroduced in the known production processes of plastic items.

A device of the prior art which carries out the filtering of the raw plastic material in its molten state provides for a cylindrical filtering chamber equipped with one or more filtering elements interposed between the supply inlet of the raw plastic material to be filtered and the downstream outlet with respect to the filtering elements for the discharge of the filtered molten plastic material.

Filtration chambers of the prior art comprise a first portion with a sealed bottom, preferably a first cylindrical portion with the bottom sealed, and a cover associated with the mouth of the first portion. When the mouth of the first portion is closed by the cover, the filtration chamber is closed and the filtration device is ready for use. The cover is preferably fixed to the first portion with bolts and nuts that can be suitably unscrewed to carry out regular maintenance and/or repair operations.

According to the prior art, the molten plastic raw material is introduced into the filtration chamber and pressurized in order to pass through the filter elements typically consisting of substantially planar filters with through openings of suitable dimensions to ensure the desired filtering effect.

During the continuous feeding of the raw material, impurities tend to gradually accumulate on the aforementioned filter surfaces.

Therefore, filtration chambers are equipped with a cleaning system for the continuous cleaning of the filter surfaces.

According to the prior art, the cleaning system comprises at least one scraper element, preferably rotating, equipped with scraping elements that slide on the filter surface to remove the accumulated impurities. At the same time, the impurities removed are expelled from the filtration chamber. The impurities collected by the scraping elements are preferably conveyed towards the center of the filter along a curved path and from there, through a channel, conveyed outside by a helical screw that extends from the center of the filter to the outside of the filtration chamber.

Typically, according to the prior art, the scraping elements and the helical screw are rotated integrally by a rotation shaft suitably rotated by a drive, normally an electric motor.

A first drawback connected to the filtration devices of the prior art lies in the need to maintain a high degree of cleanliness of the filter elements and a sufficient discharge flow of the removed impurities to ensure the desired capacity and quality of filtration of the plastic material.

Another drawback of the filtration devices of the prior art is the need to effectively remove the impurities collected by the scraping elements.

A further drawback of the filtration devices of the prior art is the need to reduce the amount of useful material removed along with impurities.

Still another drawback of the filtration devices of the prior art is their inability to remove impurities which penetrate and are stuck in the openings of the filtering elements.

Another drawback of the filtration devices of the prior art is the frequent need to replace the scraping elements that are subject to wear due to their scraping action on the surface of the filtering elements.

Yet another drawback of the filtration devices of the prior art lies in the very high costs of the filtration elements consisting of laser micro-perforated metal discs.

Filtration devices of the prior art include those using backflow cleaning systems and devices to remove impurities from the filter surface that generate a flow in the opposite direction with respect to the flow of the molten plastic material to be filtered. Backflow filter cleaning devices use a metal grid with mesh of different sizes for the different degrees of filtration. These filters using fabric-type wire mesh do not allow the use of copper scraping cleaning systems or the like that would very quickly damage said wire mesh making the filter media useless.

Said backflow cleaning systems have various drawbacks, including the need to generate a counter pressure suitable to induce a flow of material in the direction opposite the working flow.

Another drawback of the backflow filter cleaning systems of the prior art is that the backpressure and the consequent counter flow are generated by specific devices, such as hydraulic cylinders.

Another drawback of the backflow filter cleaning systems of the prior art is the impossibility of maintaining the outlet pressure of the filtered material constant.

Another drawback of the backflow filter cleaning systems of the prior art is the impossibility of controlling the amount of material that is eliminated in the cleaning cycle.

A new type of filtration device for molten plastic material with an improved backflow filter cleaning system has been designed and manufactured.

It is therefore an object of the present invention to implement a filtration device for plastic material able to improve the cleanliness of the filtering elements compared to devices of the prior art.

It is another object of the invention to implement a filtration device for plastic material able to improve the filtration quality compared to devices of the prior art.

Another object of the invention is to reduce the loss of useful material during the removal of impurities.

Yet another object of the invention is to reduce the frequency of maintenance operations for the replacement of the cleaning parts of the filtering elements.

A further object of the invention is to adequately balance the pressures so as to keep said cleaning elements properly and constantly in contact with the surface of the filter to be cleaned of impurities.

Another object of the invention is to keep the outlet pressure of the filtered material constant.

The aforesaid objects are achieved by means of a filtration device for plastic material with an improved cleaning system referred to in claim 1 below, to which reference is made for brevity's sake.

In particular, firstly, the present invention relates to a filtration device for molten plastic material with an improved cleaning system, said filtering device comprising:

a hollow body provided with a mouth and a cover that can be associated with said mouth of said hollow body to define a filtration chamber;

at least one inlet on said hollow body for the supply into said filtration chamber of said molten plastic material and at least one outlet on said hollow body for the discharge of the filtered plastic material in the molten state from said filtration chamber;

at least one first filter installed inside said filtration chamber in a position between said at least one inlet and said at least one outlet, said at least one filter being suited to define a filtering and impurity collection surface of said plastic material;

at least one pair of perforated supports installed on the sides and in contact with each filter;

a counter-pressure cleaning device installed between said at least one filter and said at least one inlet and suited to operate in contact with the perforated support installed on the side of said inlet filter of the material to be filtered, said cleaning device installed radially from the center of said filter and rotating around the center of said filter;

a discharge device of said impurities collected by said cleaning device towards a discharge outlet, said discharge device being installed centrally with respect to said cleaning device and said filter;

wherein said cleaning device comprises a rotating main body having a first side facing said filter and equipped with elements or parts for removing impurities together with the filtering surface of said filter, said main body comprising at least one channel communicating with said first side and communicating with the center of rotation of said rotating main body suited to receive the impurities collected by said elements or parts for removing impurities and to convey them to said discharge device.

It is possible that:

in said filtration chamber there may be two filters parallel to each other;

said inlet into said filtration chamber for said molten plastic material may communicate with the space between said two filters;

said outlet for the discharge from said filtration chamber of the molten filtered plastic material may communicate with the opposite lateral spaces of said two filters;

there may be two cleaning devices included in the space between said two filters, said two cleaning devices may operate on the surface of each filter facing the opposite filter, and may be diametrically opposite to each other with respect to the center of said filter;

said discharge device may collect the impurities removed from said two cleaning devices and may convey them to a single outlet.

Further detailed technical operating characteristics of the device of the present invention are set forth in the related dependent claims.

The characteristics of the present invention will be better clarified by the following description with reference to the drawings, attached by way of a non-limiting example.

FIG. 3a shows a further detail of FIG. 3, while FIG. 3b shows an axonometric sectional view of the detail in FIG. 3a.

Figure 1:
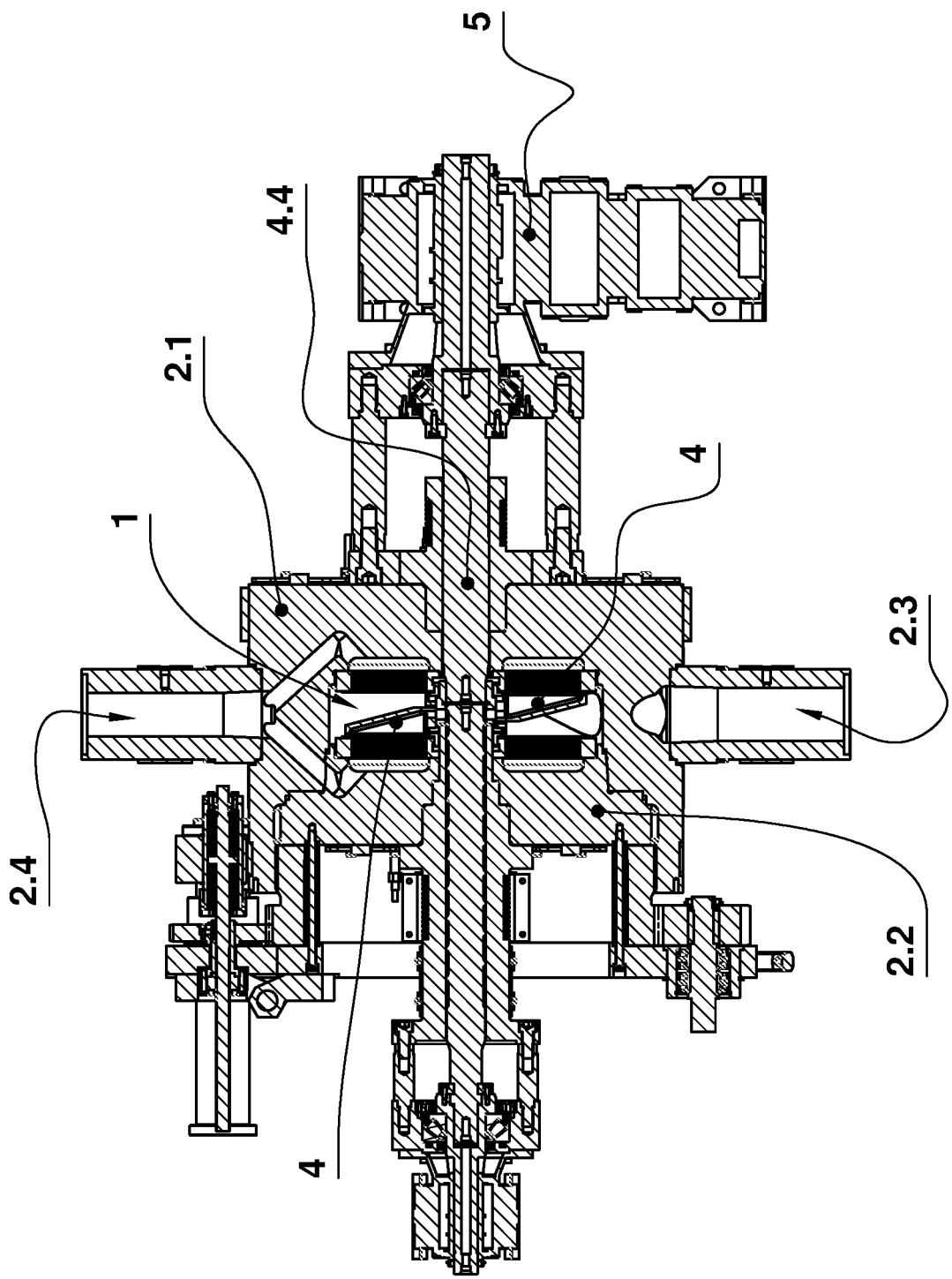
FIG. 1 shows a horizontal section of a filtration device according to a preferred embodiment of the invention.
Figure 2:
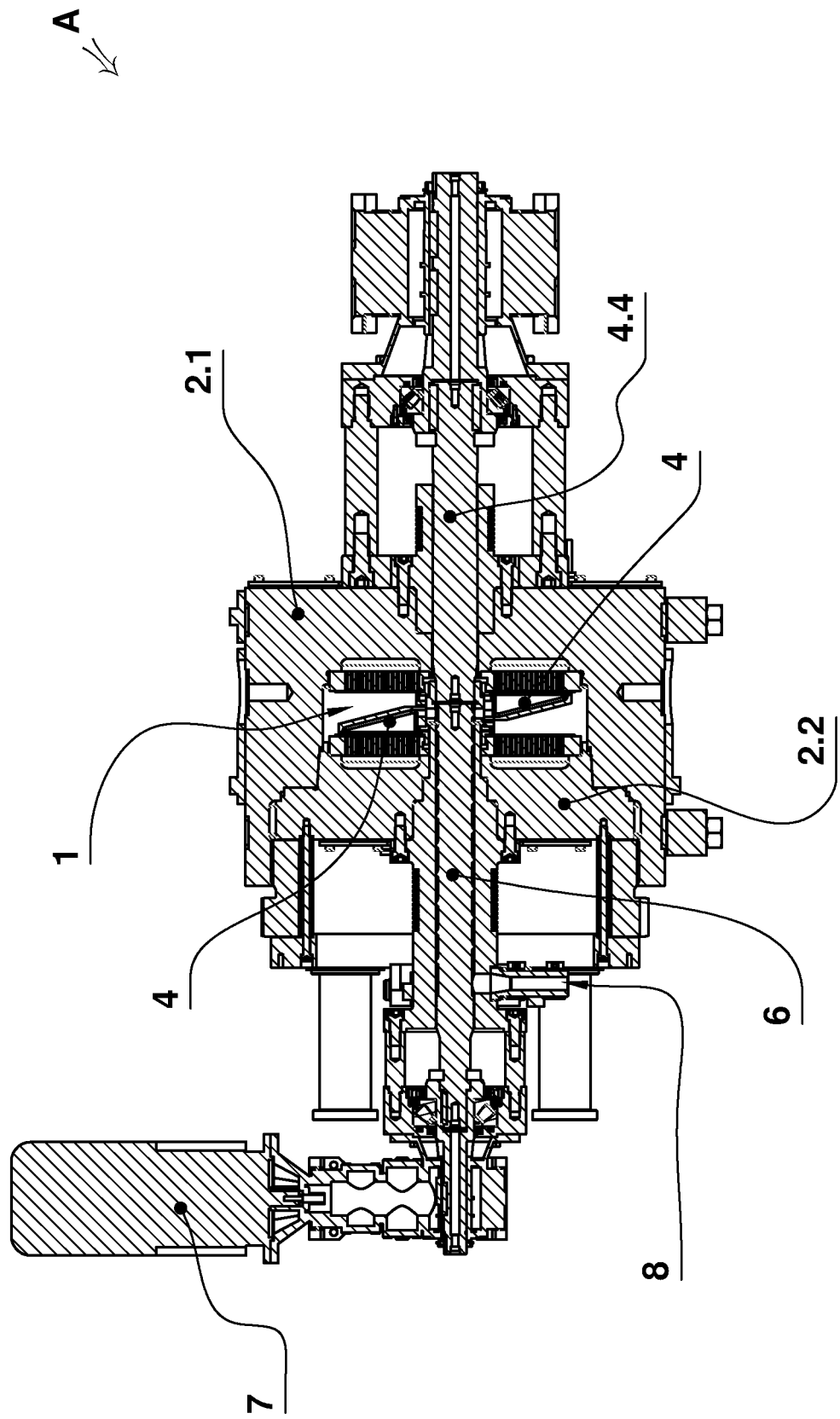
FIG. 2 shows a vertical section of a filtration device in FIG. 1.
Figure 3:
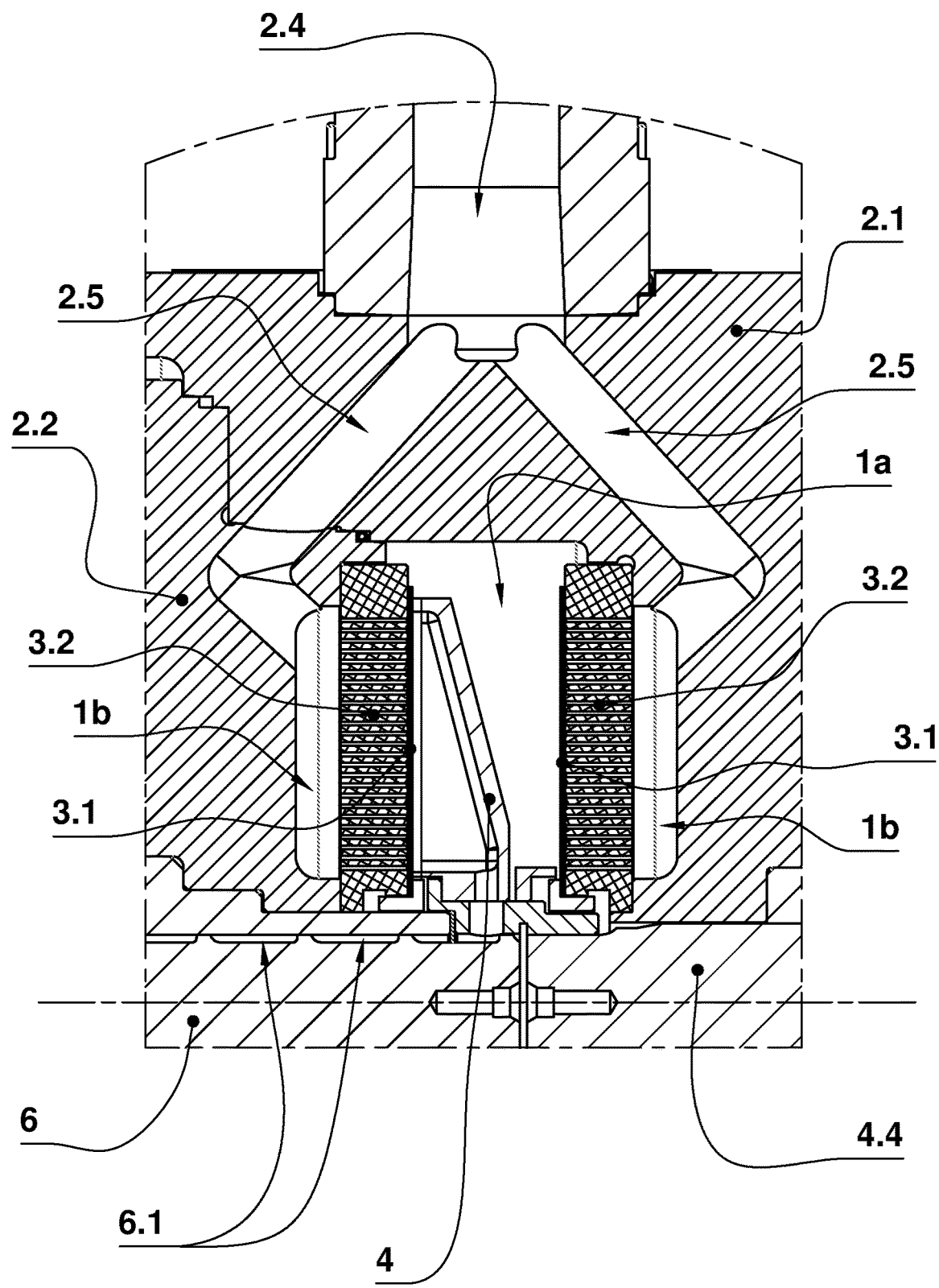
FIG. 3 shows the horizontal section of the filtration chamber in detail.
Figure 3A:
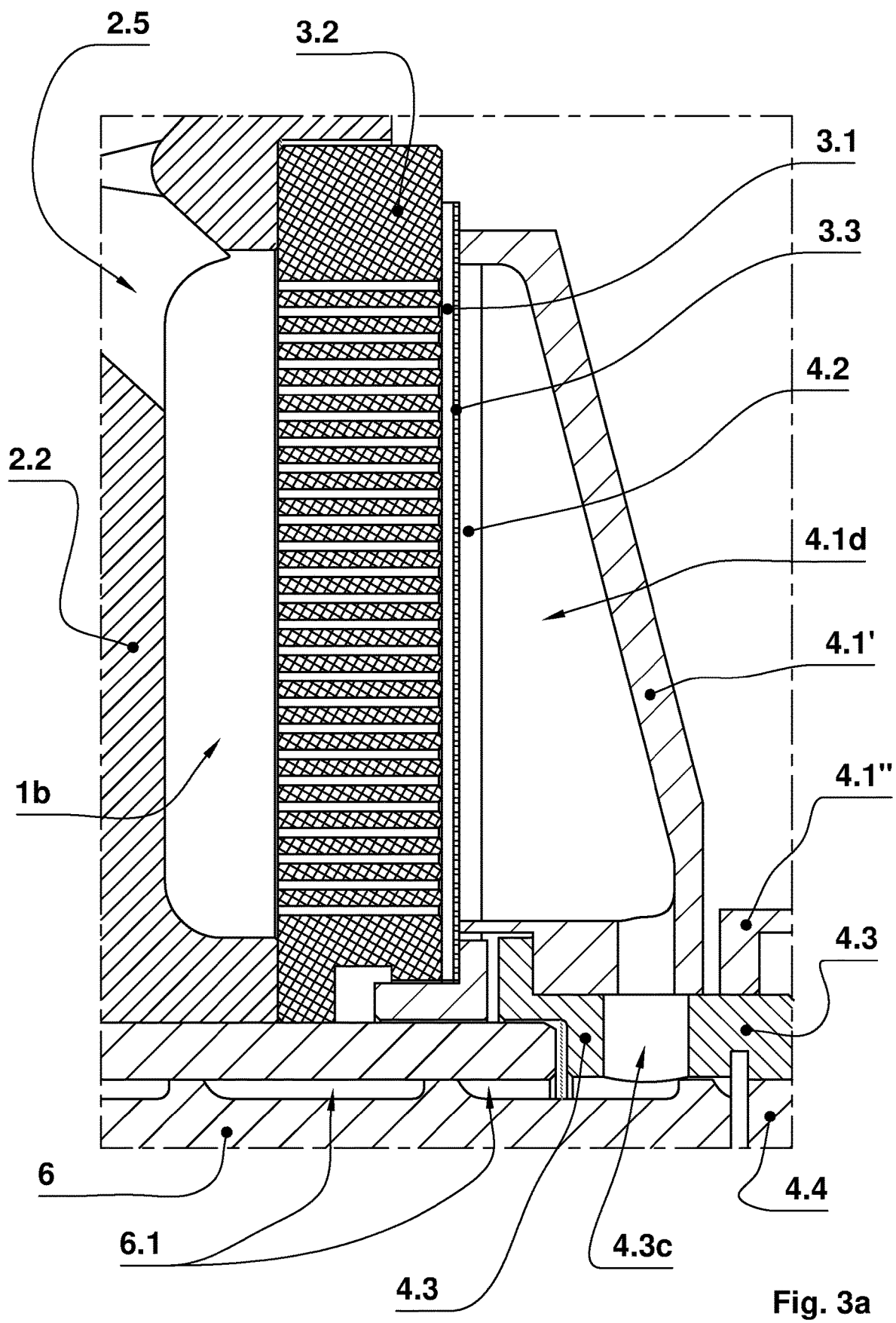
Figure 3B:
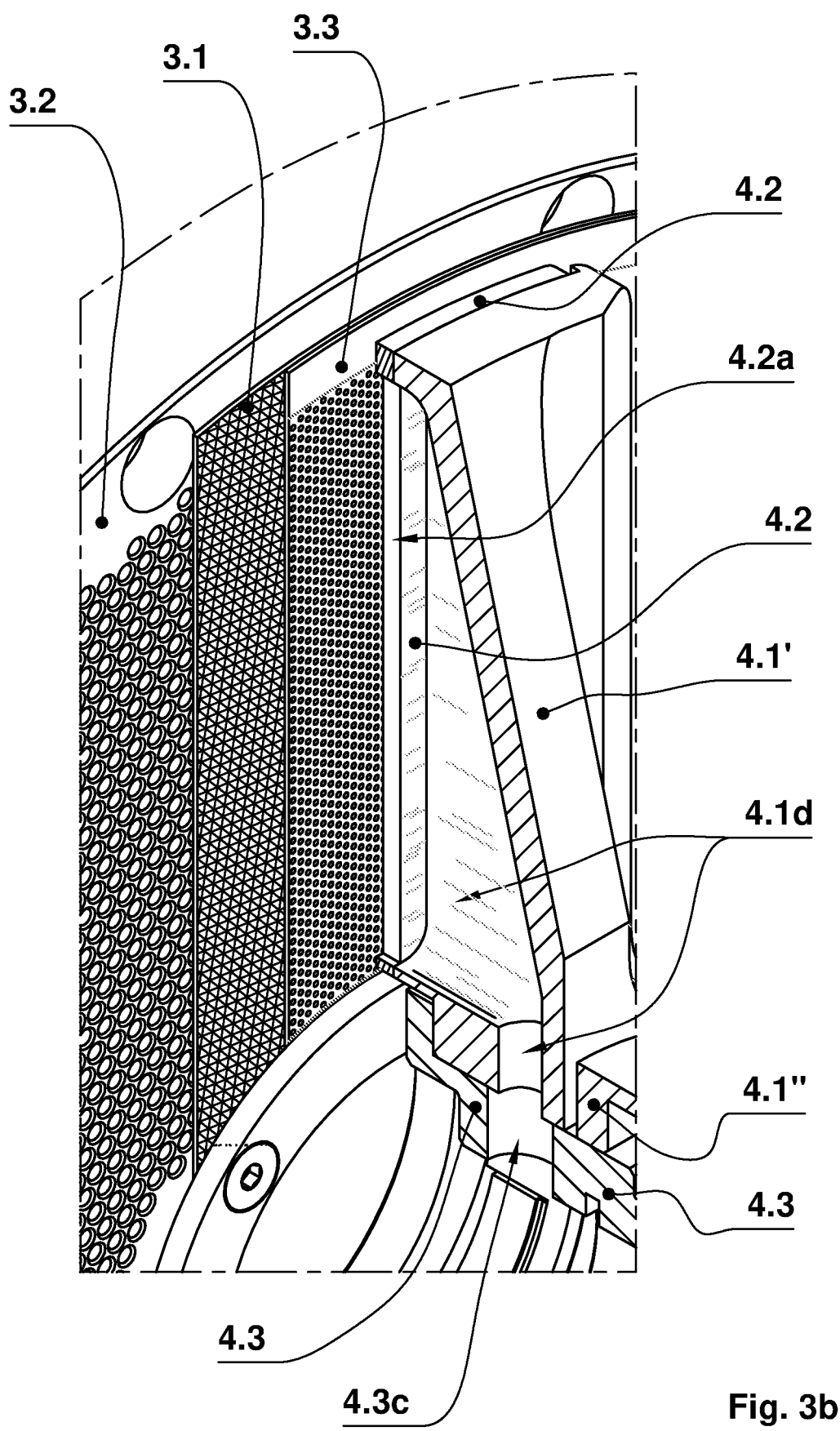

The filtering device (A) shown in FIGS. 1, 2 and 3 is suitable for use in a plastic recycling process.

The filtering device (A) has the task of filtering/stopping the impurities present in the raw plastic material to be recycled with a degree of purity depending on the size of the mesh on the filter element used.

To carry out this filtration operation, the raw plastic material to be recycled is first heated and brought to its molten state to then be conveyed to the filtering device (A), in particular to a filtration chamber (1) of the device (A) itself.

The filtering device (A) comprises a hollow body (2.1) provided with an opening on one side and a cover or bulkhead (2.2) suited to hermetically close said opening in order to define the filtration chamber (1).

Said hollow body (2.1) has an inlet (2.3), for the introduction of the plastic material in its molten state into the filtration chamber (1) in order to be filtered, and an outlet (2.4) for the discharge of the plastic material in its filtered molten state from the filtration chamber (1).

Said inlet (2.3) and outlet (2.4) are located on the side walls of said hollow body (2.1) with respect to said cover or bulkhead (2.2), as well as diametrically opposite one (2.3) with respect to the other (2.4).

Inside said filtration chamber (1) there are filtering means (3.1), suited to divide said filtration chamber (1) into two or more compartments (1a, 1b) of which:

a first compartment (1a), directly communicating with said inlet (2.3), said first compartment (1a) suited to receive the plastic material to be filtered, at least one second compartment (1b), communicating with said outlet (2.4), each said second compartment (1b) suited to receive the filtered plastic material.

In the example shown there are two filtering means (3.1), consisting of two metal meshes (3.1) with openings of an appropriate size placed parallel to each other and suitably spaced from each other.

The space between said two filtering means (3.1) and the inner walls of the hollow body (2.1) make up said first compartment (1a), while the space between each filtering means (3.1) and the inner walls of the hollow body (2.1) and of the cover (2.2) opposite to the other filtering means (3.1) make up said second compartments (1b).

Said second compartments (1b) are in communication with said outlet (2.4) directly or, preferably as shown in the example, by auxiliary ducts (2.5).

Each filtering means (3.1) further comprises a first perforated support (3.2) having holes larger than the metal mesh filtering means (3.1).

This first perforated support (3.2), also called breaker, is suited to support and keep said metal mesh (3.1) flat, since it is subjected to the high thrust pressure of the plastic material in its molten state to be filtered. Said first support (3.2) is placed in said second compartment (1b) directly in contact with said metal mesh (3.1).

There is a second perforated support (3.3) on the side of said metal mesh (3.1) facing said first compartment (1a), so that the metal mesh (3.1) itself is held and kept flat between said two perforated supports (3.2, 3.3).

Between said two metal mesh filtering means (3.1) there is a cleaning device (4) intended to remove the collected impurities from the filtering surface of each of the metal meshes (3.1). In particular, said cleaning device (4) is suited to slide on the surface facing said first compartment (1a) of each second perforated support (3.3) and to collect the impurities collected by said metal meshes (3.1).

There is also a discharge device (6) for the impurities collected by said cleaning device (4).

Figure 4B:
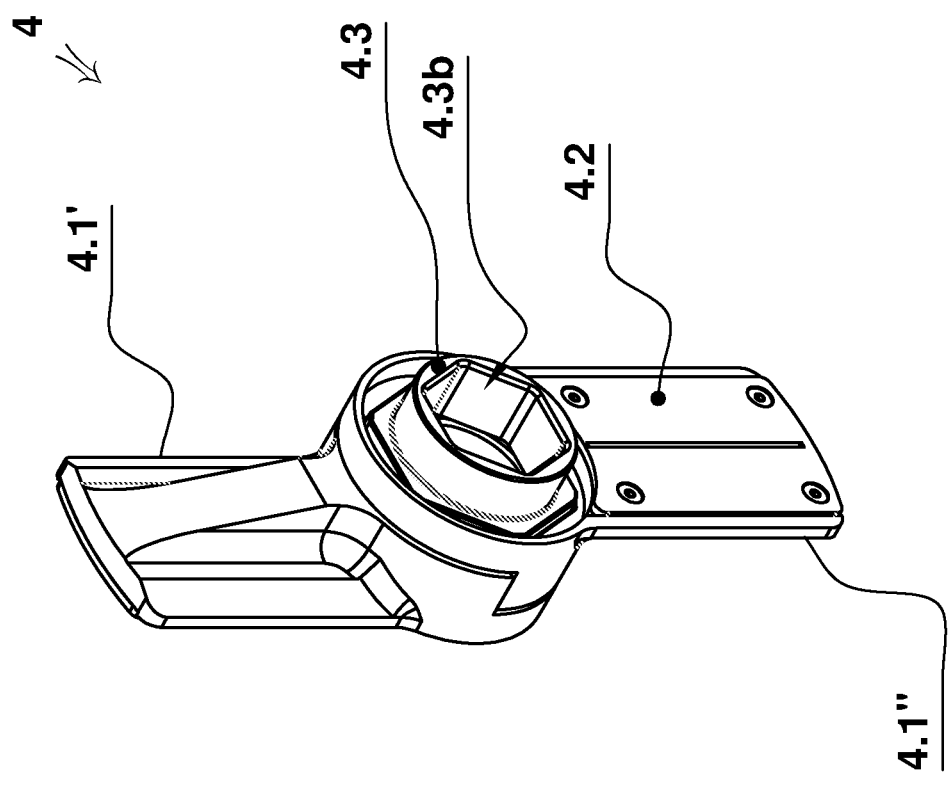
Figure 4A:
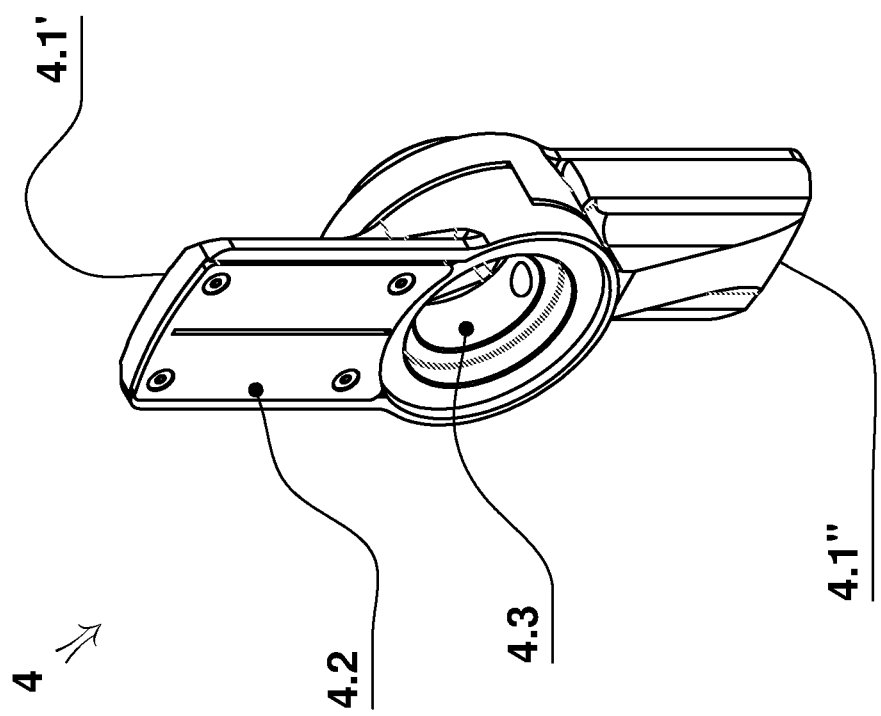
Figure 5:
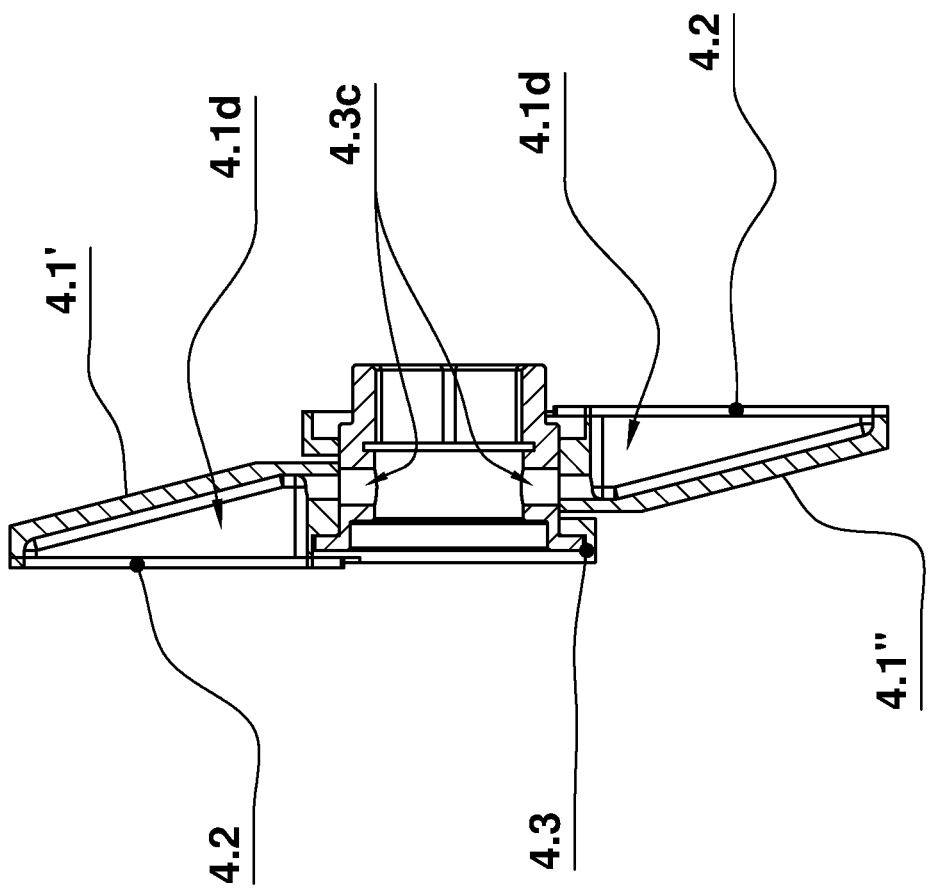

FIGS. 4*a*, 4*b*, and 5 show various views of said cleaning device (4), comprising two main hollow bodies (4.1', 4.1"), two adhering walls (4.2) to said metal meshes (3.1) of said filtering means (3.1), connecting elements (4.3) with moving means (4.4). These moving means (4.4) consist, in this example, of a rotation and centering shaft (4.4), shown in FIGS. 1, 2, 3. Said rotation and centering shaft (4.4) has at least one non-circular section.

Figure 6:
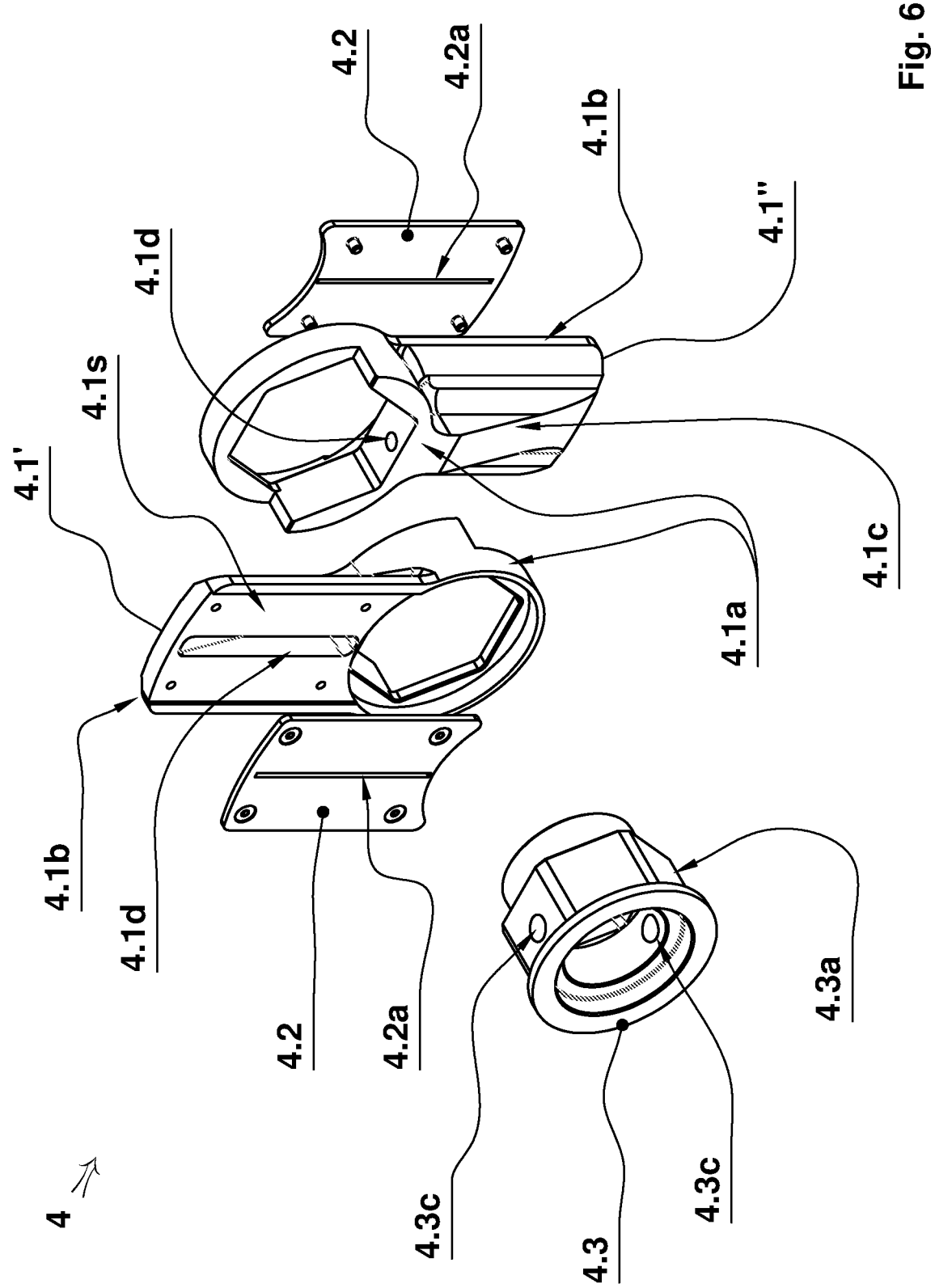

FIGS. 4*a* and 4*b* show two axonometric views of the cleaning device (4), FIG. 5 shows a section of the cleaning device (4), FIG. 6 shows an axonometric view of the various parts (4.1', 4.1", 4.2, 4.3) of the cleaning device (4).

In the example shown there is a pair of main bodies (4.1', 4.1"), but the above considerations are to be deemed equally valid for two or more pairs of main bodies (4.1', 4.1").

Each main body (4.1', 4.1") comprises, in turn, a first generally cylindrical part (4.1*a*), a second substantially flat or parallelepipedal part (4.1*b*) generally radial with respect to said cylindrical part (4.1*a*), a third part (4.1*c*) generally triangular connecting said first part (4.1*a*) and said second part (4.1*b*).

Said first part (4.1*a*) of each main body (4.1', 4.1") has elements, parts, and structures for the coaxial coupling with the first part (4.1*a*) of the other main body (4.1', 4.1") in such a way as to prevent their reciprocal rotation but enable their reciprocal translation along the common axis of rotation (6, 4.4).

Said second part (4.1*b*) of each main body (4.1', 4.1") has a seat (4.1*s*) for housing and fixing one of said adhering walls (4.2).

Internally, said third part (4.1*c*) of each main body (4.1', 4.2") has a duct (4.1*d*) suited to connect said seat (4.1*s*) of said second part (4.1*b*) with the internal space of said first generally cylindrical part (4.1*a*).

Said two main bodies (4.1', 4.1") are identical, and suited to be coupled to each other in a specular manner so that their second parts (4.1*b*) are opposed, both diametrically with respect to the axis of said first coupling parts (4.1*a*), with the seat (4.1*s*) of each second part (4.1*b*) facing the direction opposite the opposite second part (4.1*b*).

Said two main bodies (4.1', 4.1") are such that, when they are coupled one facing the other, their internal ducts (4.1*d*) of said first generally cylindrical part (4.1*a*) are opposite and coaxial.

Each adhering wall (4.2) consists of a sheet or plate suited to be housed in the corresponding seat (4.1*s*) of a second part (4.1*b*).

In particular, each said adhering wall (4.2) is suited to be placed in contact with said second perforated support (3.3) of a metal mesh of the filtering means (3.1) and has a slit or opening (4.2*a*) substantially radial with respect to the axis of each main body (4.1', 4.1").

The connection element (4.3) consists of a generically cylindrical element, suited to couple coaxially with said first parts (4.1*a*) of said main bodies (4.1', 4.1") and coaxially with said rotation and centering shaft (4.4).

In particular, said connection element (4.3) has its outer surface (4.3*a*) suited to obliquely create the rotation of said main bodies (4.1', 4.1") coupled to each other, and also has at least part of its inner surface (4.3*b*) suited to couple with said rotation and centering shaft (4.4).

In the preferred embodiment the shape of the outer surface (4.3*a*) and the inner surface (4.3*b*) of said connection member is polygonal, more specifically, hexagonal. Said connection element (4.3) also has at least one hole, groove or duct (4.3*c*) suited to connect the outer surface (4.3*a*) of the connection element (4.3) with its inner surface (4.3*b*) so that the duct (4.1*d*) of said first parts (4.1*a*) of said main bodies (4.1', 4.1") is connected with the inner surface (4.3*b*) of said connection element (4.3).

In the example shown, said connection element (4.3) has two opposing ducts (4.3*c*) suited to be aligned and in communication with the respective ducts (4.1*d*) of said two coupled main bodies (4.1', 4.1").

The rotation and centering shaft (4.4) consists of a shaft (4.4) passing through the hollow body (2.1), a filtering means (3.1), and the relative pair of perforated supports (3.2, 3.3).

Said rotation and centering shaft (4.4) is suited to be connected with an electric motor (5), outside said hollow body (2.1), and with said connection element (4.3), inside said hollow body (2.1) so as to rotate said connection element (4.3) and the entire cleaning device (4).

In particular, said rotation and centering shaft (4.4) extends from the outside of said hollow body (2.1) up to about half the length of said connection element (4.3), without reaching said hole, groove or duct (4.3*c*) of said connection element (4.3).

The discharge device (6) of said impurities collected by said cleaning device (4) comprises a shaft (6) with an external helical groove (6.1) or screw suited to connect the internal surface (4.3*b*) of said connection element (4.3) communicating with its hole, groove or duct (4.3*c*) with a discharge opening (8) outside the filtration chamber (1).

In particular, said shaft (6) with external helical groove (6.1) is coaxial with said rotation and centering shaft (4.4) and extends from the inside of said connection element (4.3) up to a discharge opening (8) outside said hollow body (2.1).

Said shaft (6) with external groove (6.1) of said discharge device (6) is connected to an electric motor (7), outside said hollow body (2.1).

The plastic material introduced into the new filtration device (A) is filtered by two filtering means (3.1), obtaining a higher filtration efficiency than the filtration devices of equivalent size of the prior art.

The removal of impurities from the filtering means (3.1) does not take place by scraping but means of a counter flow. In fact, the adhering walls (4.2) run along the surface of said second perforated supports (3.3) of the filtering means (3.1) without touching or abrading said filtering means (3.1) and therefore significantly reducing the wear of both the filtering means (3.1) and the adhering walls (4.2).

This reduces the frequency of maintenance to replace the cleaning parts of the filtering elements (3.1).

Since the filtered plastic material which already passed through said filtering means (3.1) into the second compartments (1.*b*) of the filtration chamber (1) has considerable pressure, it exerts a counter pressure on the filtering means (3.1) removing the impurities from the filtering means (3.1) through said second perforated supports (3.3) towards the first compartment (1*a*) of the filtration chamber (1), and through said slit or opening (4.2*a*) of the adhering wall (4.2) of the cleaning device (4) from which it is discharged.

From the inside of each main body (4.1', 4.1") the material removed by the filtering means (3.1) flows into the connection element (4.3) and from there it flows into the external helical groove (6.1) of the shaft of the discharge device (6) which moves it away towards said discharge opening (8) outside the filtration chamber (1).

Said main bodies (4.1', 4.1") of the cleaning device (4) are continuously rotated on the surface of said filtering means (3.1) by the relative rotation and centering shaft (4.4) and by the relative electric motor (5).

The removal of the material collected by said filtering means (3.1) and accumulated in said main bodies (4.1', 4.1") takes place by means of said shaft of the discharge device (6) which is rotated by a different electric motor (7).

The adjustment of the rotation speed of the main bodies (4.1', 4.1") of the cleaning device (4) and the rotation speed of the shaft of the discharge device (6) allows all the material collected by said filtering means (3.1) to be discharged limiting the loss of useful material to be filtered, as well as regulating the pressure of the plastic material to be filtered.

The pressure of the plastic material to be filtered is measured inside the first compartment (1*a*) of the filtration chamber (1). When this pressure increases and reaches a threshold, it is an indication that the metal mesh (3.1) of the filtering means (3.1) is clogged by the filtered impurities and consequently the rotation speeds of both the cleaning device (4) and the discharge device (6) are regulated to keep said pressure constant inside the first compartment (1*a*) of the filtration chamber (1).

In this way, the impurities are adequately removed from the metal meshes (3.1) and from the second perforated supports (3.3), limiting the loss of plastic material.

The flow rates and pressures in said auxiliary ducts (2.5), towards said outlet (2.4) of the plastic material in its filtered molten state, are balanced and equal given that the filtered material must go through equal paths.

The two ducts (4.3*c*) of said connection element (4.3) intended to remove the impurities collected by the cleaning device (4) are aligned and opposing and are both in continuous communication with the helical groove (6.1) of the shaft (6) of the discharge device (6).

This continuous alignment and communication of all said ducts (4.3*c*) of said connection element (4.3) with the discharge device (6) results in an equal discharge pressure of the flows removing the impurities from all the main bodies (4.1', 4.1") of the cleaning device (4). In turn, this means that all said adhering walls (4.2) and all said second perforated supports (3.3) face equal wear, and that all said filtering means (3.1) are subjected to an equal cleaning counter pressure and an equal cleaning of the impurities.

The rotational speed of the discharge device (6), directly proportional to the discharge flow rate, and the rotational speed of the cleaning device (4) are related so as to enable all the contaminated material and the impurities accumulated in the second perforated supports (3.3) that are facing the slit or opening (4.2*a*) of each said adhering wall (4.2) to be completely removed from the cleaning device (4).

The specific shape and freedom of axial translation of each main body (4.1', 4.1") of the cleaning device (4) means that the pressure of the plastic material to be filtered keeps each said main body (4.1', 4.1") and each relative adhering wall (4.2) properly and constantly adhering to each relative second perforated support (3.3).

The discharge device (6) generates, in its rotation, a controlled discharge flow rate making the counter pressure just a support factor.

The slit or opening (4.2*a*) of each said adhering wall (4.2) and each second perforated support (3.3) have a shape, dimensions, and gap, such as to be able to continuously work and draw in only the contaminated material minimizing the loss of useful plastic material while maintaining the pressure constant.

The new cleaning system described above enables the removal of even small controlled volumes of only the material to be eliminated, allowing work with highly contaminated materials while minimizing the waste of useful plastic material.

Therefore, with reference to the preceding description and the attached drawings the following claims are made.

The invention claimed is:

1. A filtering device (A) for a plastic material in a molten state, said filtering device (A) comprising:
    a hollow body (2.1) provided with a mouth and a cover (2.1) configured to be associated with said mouth to define a filtration chamber (1);
    an inlet way (2.3) for receiving said plastic material in the molten state into said filtration chamber (1) and an outlet way (2.4) for discharging the filtered plastic material in the molten state from said filtration chamber (1);
    two filters (3.1) made up of a metal mesh and arranged side by side in said filtration chamber (1), said two filters (3.1) defining a first compartment (1 *a*) which communicates directly with said inlet way (2.3) and a second compartment (1 *b*) which communicates with said outlet way (2.4);
    a first holed support (3.2) and a second holed support (3.3), each of said first holed support and said second holed support (3.2, 3.3) being arranged so as to adhere to one of two sides of each of the said two filters (3.1), holes of said first holed support and said second holed support (3.2, 3.3) being larger than meshes of the two filters made up of the metal mesh (3.1);
    a cleaning device (4) arranged in said first compartment (1*a*) between said two filters (3.1); and
    an evacuation device (6, 7) configured to discharge said impurities collected by said cleaning device (4) towards an evacuation outlet (8), said evacuation device (6, 7) being arranged centrally with respect to said cleaning device (4);
    wherein said cleaning device (4) comprises one or more pairs of main hollow bodies (4.1', 4.1"), one or more pairs of adhering walls (4.2) which adhere to said second holed support (3.3), and a moving system (4.4),
    wherein a first main hollow body of said one or more pairs of main hollow bodies (4.1', 4.1") is configured to be coupled with a second main hollow body of said one or more pairs of main hollow bodies (4.1", 4.1') in a position diametrically opposite thereto and in such a way that each of the first main hollow body and the second main hollow body rotate integrally with each other and are free to translate along a common axis,
    wherein each of said one or more pairs of main hollow bodies (4.1', 4.1") is configured to support each of said one or more pairs of adhering walls (4.2) so as to remain adherent to a surface of a corresponding second holed support (3.3) of one of the two filters (3.1), and
    wherein each of said one or more pairs of adhering walls (4.2) is provided with a slit or an opening (4.2 *a*) configured to place a surface of said one or more pairs of adhering walls (4.2) that is in contact with the second holed support (3.3) in communication with an inside of said one or more pairs of main hollow bodies (4.1', 4.1") to which said one or more pairs of adhering walls (4.2) is joined, and
    wherein said one or more pairs of main hollow bodies (4.1', 4.1") are provided with an internal connection duct (4.1 *d*) configured to connect a seat (4.1 *s*) of said one or more pairs of adhering walls (4.2), the inside of each said one or more pairs of main hollow bodies (4.1', 4.1") and an inside of a central mutual coupling part (4.1 *a*).

2. The filtering device (A) according to claim 1, wherein said one or more pairs of main hollow bodies (4.1', 4.1") of said cleaning device (4) are set rotating by a rotation and centering shaft (4.4) driven by motorized means (5).

3. The filtering device (A) according to claim 1, wherein said evacuation device (6) configured to discharge said impurities collected by said cleaning device (4) comprises a shaft (6) with an external helical groove (6.1), or a helical screw, configured to connect an inside of the central mutual coupling part (4.1 *a*), which couples said one or more pairs of main hollow bodies (4.1', 4.1") together, with the evacuation outlet (8) located outside of the filtration chamber (1).

4. The filtering device (A) according to claim 2, further comprising a connection element (4.3) constituted by a cylindrical element configured to be coupled and coaxially constrained to said central mutual coupling part (4.1 *a*) of said one or more pairs of main hollow bodies (4.1', 4.1") and to be coupled and coaxially constrained to said rotation and centering shaft (4.4), and wherein said connection element (4.3) is provided with one or more pairs of holes, grooves or ducts (4.3 *c*) lying on a same plane, which is orthogonal to said rotation and centering shaft (4.4), and wherein the holes, grooves or ducts (4.3 *c*) of each pair of said one or more pairs of main hollow bodies are arranged according to a central symmetry with respect to the rotation and centering shaft (4.4) and are configured to connect an external surface (4.3 *a*) and an internal surface (4.3 *b*) of the connection element (4.3) in such a way as to connect each internal connection duct (4.1 *d*) of said central mutual coupling part (4.1 *a*) of said one or more pairs of main hollow bodies (4.1', 4.1") with the internal surface (4.3 *b*) of said connection element (4.3) and with said external helical groove (6.1) of said shaft (6), or helical screw, of said evacuation device (6).

5. The filtering device (A) according to claim 1, wherein both the outlet way (2.4) for the filtered material and a mutual position and arrangement of the one or more pairs of main hollow bodies (4.1', 4.1") of the cleaning device (4) with respect to said two filters (3.1) are the same and adapted to substantially maintain the same pressure on all of the one or more pairs of main hollow bodies (4.1', 4.1") and the same pressure of the filtered material exiting from said two filters (3.1).

6. The filtering device (A) according to claim 4, wherein the internal connection ducts (4.1 *d*) of said one or more pairs of main hollow bodies (4.1', 4.1") have the same cross section, and wherein said holes, grooves or ducts (4.3 *c*) of said connection element (4.3) end into said evacuation device (6) in an identical and symmetrical manner in such a way as to maintain a flow of the impurities collected by the one or more pairs of adhering walls (4.2) and by the one or more pairs of main hollow bodies (4.1', 4.1") of said cleaning device (4) towards said evacuation device (6) and towards said evacuation outlet (8) identical.

7. The filtering device (A) according to claim 1, wherein a rotation speed of the cleaning device (4) and of the evacuation device (6) are regulated to minimize an evacuation of useful material that is removed together with the impurities and to maintain a constant pressure inside the filtration chamber (1).

\* \* \* \* \*